United States Patent

Huggett et al.

Patent Number: 5,334,309
Date of Patent: Aug. 2, 1994

[54] FILTER UNITS

[75] Inventors: David J. Huggett, Portsmouth; Jamie Collard, Southampton, both of England

[73] Assignee: Pall Corporation, Glen Cove, N.Y.

[21] Appl. No.: 948,633

[22] Filed: Sep. 23, 1992

[30] Foreign Application Priority Data

Sep. 27, 1991 [GB] United Kingdom ............... 9120692

[51] Int. Cl.⁵ ............................................ B01D 35/147
[52] U.S. Cl. ..................................... 210/133; 210/136; 210/137; 210/234; 210/436; 210/444
[58] Field of Search ............... 210/133, 136, 137, 420, 210/248, 234, 235, 232, 418, 428, 429, 431, 130, 436, 472, 444

[56] References Cited

U.S. PATENT DOCUMENTS

| | | | |
|---|---|---|---|
| 1,955,903 | 4/1934 | Cammen | 210/165 |
| 3,080,972 | 3/1963 | Smith | 210/136 |
| 3,288,289 | 11/1966 | Rosaen | 210/90 |
| 3,628,662 | 12/1971 | Kudlaty | 210/136 |
| 3,777,889 | 12/1973 | Henderson | 210/136 |
| 4,051,031 | 9/1977 | Suzuki | 210/420 |
| 4,379,053 | 4/1983 | Brane | 210/234 |
| 5,049,269 | 9/1991 | Shah | 210/234 |

FOREIGN PATENT DOCUMENTS

656494 of 1948 United Kingdom.
707718 4/1954 United Kingdom.

Primary Examiner—Matthew O. Savage
Attorney, Agent, or Firm—Leydig, Voit & Mayer

[57] ABSTRACT

A filter unit comprises a housing containing a filter element. The housing includes an inlet for fluid and an inlet passage which passes fluid to the filter element. An outlet passage conveys filtered fluid from the element to an outlet to the housing. The inlet passage includes a valve which can close the inlet passage. When this happens, a by-pass valve opens and connects the inlet to the housing direct to the housing outlet. An anti-back-flow valve is provided in the outlet passage to prevent fluid passing back down the outlet passage to the filter element. The filter element can then be changed. A re-pressurization valve is provided to pass fluid to the element while the inlet passage is still closed and a vent port vents air from the element during this re-pressurization. Once re-pressurization is complete, the vent port and the re-pressurization valve are closed and the inlet valve opened so that filtration recommences.

13 Claims, 2 Drawing Sheets

FILTER UNITS

BACKGROUND TO THE INVENTION

1. Field of the Invention

The invention relates to filter units.

A filter unit contains a filter element and receives fluid to be filtered. After passage through the element, filtered fluid passes from the unit. Filter elements have only a limited life; after a time they become clogged with filtrate and require replacement by removal of a used filter element from the filter unit and the insertion of a new filter element.

In critical production processes, there are often found hydraulic and lubrication systems that are required to operate continuously with extremely clean fluid and so fluid is passed to such systems through a filter unit. When the filter elements in such units become blocked, it is necessary to replace them immediately without interruption of fluid flow, thereby maintaining system availability.

2. Brief Description of the Prior Art

In the past, this has been dealt with in a number of ways. In one proposal, the filter unit has included two filter elements arranged in parallel so that fluid to be filtered is normally passed to one of the elements in the unit but, when that element requires replacement, the fluid is passed to the other of the elements.

In a second but similar arrangement, two filter units are arranged in parallel and pipework and valves are arranged so that fluid to be filtered can be passed through one or other of the units. In the same way as with the first proposal, therefore, one filter element can filter fluid while the other is being replaced.

A third proposal is to provide a single filter unit and to incorporate the unit into pipework that provides a by-pass between the inlet to the unit and the outlet to the unit. By providing a valve in pipework leading to the inlet, a normally closed valve in the by-pass pipework and a non-return valve in pipework leading from the outlet, closure of the inlet valve isolates the unit for replacement of the filter element while the by-pass valve is opened so that the fluid passes through the by-pass during replacement.

The proposals in which two filter units are provided have a disadvantage that two filter elements are needed when only one is required for most of the time. Thus there is capital outlay on filter capacity that is, in fact, only needed very intermittently and for a short time. In addition, the size of such an assembly is substantial and this may make it difficult to install in certain locations.

Where two parallel filter units are provided, the installation and additional pipework and valves may result in large pressure drops across the unit which is disadvantageous. There may also be difficulties in closing off one filter unit before opening the other and this may result in isolation of the downstream system from fluid flow, which is again disadvantageous.

A single system with external valves and pipework has the disadvantage that the additional pipework and valves increase the cost and cause a large pressure drop across the system. Also, it may not be possible simultaneously to open the by-pass valve as the inlet valve is closed (and vice versa) and this may isolate the downstream system from fluid flow.

GB-A-656494 discloses a filter unit including a filter element with an inlet passage leading to the element and an outlet passage leading from the filter element. A by-pass passage extends between the inlet and outlet passages and includes a valve which opens and closes the by-pass passage in accordance with the absolute fluid pressure. The inlet and the outlet passage are controlled by valves responsive to the difference in pressure between the inlet passage and the outlet passage.

U.S.Pat. No. B 4,379,053 discloses a filter unit including a filter element with an inlet passage leading to the filter element and an outlet passage leading from the filter element. A by-pass passage extends between the inlet and outlet passages. A rotary valve in one position diverts incoming fluid into the inlet passage and closes the by-pass passage and in a second position closes the inlet passage and opens the by-pass passage. An anti backflow valve is provided in the outlet passage upstream of its connection to the by-pass passage.

SUMMARY OF THE INVENTION

According to the invention, there is provided a filter unit comprising a housing including a bowl for receiving a filter element, an inlet passage leading through the housing to the bowl for the passage thereto of fluid to be filtered, an outlet passage for filtered fluid leading through the housing from the bowl, an anti-backflow valve in the outlet passage, a by-pass passage extending through the housing between the inlet passage and a point on the outlet passage downstream of the anti-backflow valve, a valve provided in the inlet passage downstream of the connection between the inlet passage and the by-pass passage and operable to open or close the inlet passage, and a by-pass valve which operates to open the by-pass passage when the inlet passage is closed, for replacement of the filter element in the bowl, and to close the by-pass passage when the inlet passage is opened, to redirect fluid to the filter element.

In this way, by providing only one filter housing and element, the size of the unit is minimized and the capital outlay is minimized. In addition, by having all the components in a single housing, there is minimum pressure drop.

The following is a more detailed description of an embodiment of the invention, by way of example, reference being made to the accompanying drawings in which:

DESCRIPTION OF THE PREFERRED EMBODIMENTS

Figure 1:
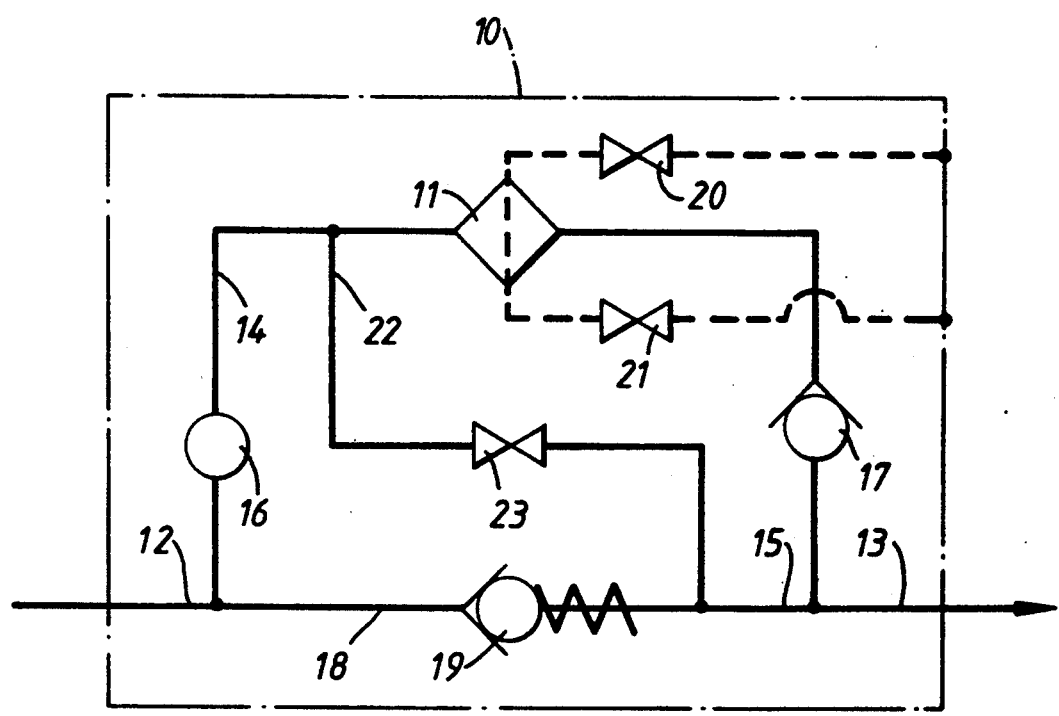
FIG. 1 is a schematic hydraulic diagram of a filter unit incorporating a filter element.

Referring first to FIG. 1, the filter unit comprises a housing schematically shown in chain-dot line at 10. The housing 10 contains a filter element 11 and has an inlet 12 for fluid to be filtered and an outlet 13 for filtered fluid.

An inlet passage 14 leads through the housing 10 from the inlet 12 to the filter element 11 and an outlet passage 15 leads through the housing 10 from the filter element 11 to the outlet 13. An inlet valve 16 is provided in the inlet passage 14 and is operable to open or close the inlet passage 14. An anti-backflow valve 17 is provided in the outlet passage and permits flow only in a direction from the filter element 11 to the outlet 13.

A by-pass passage 18 extends through the housing 10 between the inlet 12 and the outlet 13. A by-pass valve 19 is provided in this passage 18. The valve 19 allows flow only in a direction from the inlet 12 to the outlet 13 when the pressure at the valve 19 exceeds a predetermined level.

In addition, a drain plug 20 is connected to the filter element 11 and is operable to allow fluid to be drained from the element. A vent plug 21 is also connected to the element 11 and is operable to vent air out of the filter element 11.

A further passage 22 extends between a point on the inlet passage 14 downstream of the inlet valve 16 and a point on the by-pass passage 18 downstream of the by-pass valve 19. This further passage 22 is controlled by a re-pressurization valve 23.

In use, the filter unit operates as follows.

In normal use, the inlet valve 16 is open and the drain plug 20, the vent plug 21 and the re-pressurization valve 23 are closed. Fluid to be filtered enters the inlet 12 and passes through the inlet passage 14 to the filter element 11. Filtered fluid exits the filter element 11 and passes through the outlet passage 15 to the outlet 13. The by-pass valve 19 is closed because the pressure at the valve 19 is not sufficient to open the valve 19.

When it is required to change the filter element 11, the procedure is as follows. First, the inlet valve 16 is closed. This raises the pressure at the by-pass valve 19 which opens so that fluid flows through the by-pass passage 18 to the outlet 13. The anti-backflow valve 17 prevents the passage of fluid through the outlet passage 15 to the element 11. The vent plug 21 is opened to allow the pressure in the element 11 to decay and the drain plug 20 is then opened to drain fluid from the element 11 and, once drained, the element 11 is removed and replaced with a new element. The drain plug 20 is then closed and the re-pressurization valve 23 is opened. The fluid passes from the by-pass passage 18 to the filter element 11 through the further passage 22 to displace air from the filter element 11, which exits through the vent plug 21. When fluid begins to pass out of the vent plug 21, the vent plug 21 is closed. The inlet valve 16 is then opened which causes the by-pass valve 19 to close. Thus, normal fluid flow through the filter element 11 is resumed.

In this way, the filter element 11 can be replaced quickly and easily. Since all the parts are within the housing 10, the pressure drop can be minimized and the size of the unit can be minimized. The presence of the vent plug 21 and the drain plug 20 ensure minimal fluid spillage and ensure that air is removed before filtration is recommenced so that any system receiving fluid from the filter unit does not ingest air.

Figure 2:
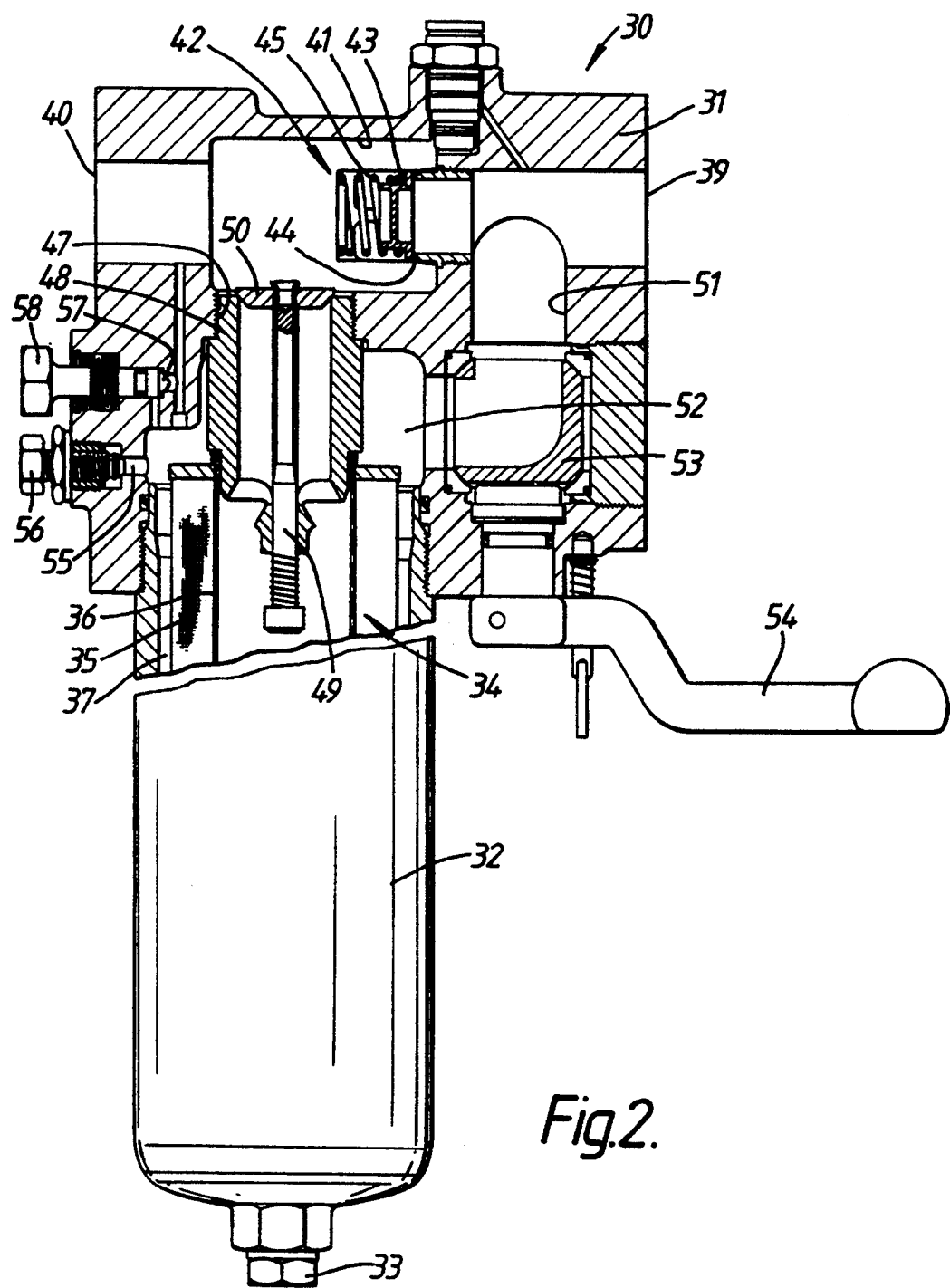
FIG. 2 is a side elevation partly in cross-section, of an embodiment of the filter unit of FIG. 1.

An embodiment of the system described above with reference to FIG. 1 is shown in FIG. 2. Referring now to FIG. 2, the filter unit comprises a housing indicated generally at 30. The housing has two components: a body 31 and a cylindrical casing 32 which depends from the body 31, which is open at an upper end, which is in screw-threaded engagement with the body 31 at the upper end and which is closed at a lower end. The lower end is provided with a drain plug 33.

The casing 32 encloses a filter element 34 which comprises a pleated cylinder of filter media 35 arranged around a cylindrical core 36. There is an annular space 37 between the outer surface of the filter element 34 and the casing 32.

The body 31 includes an inlet 39 and an outlet 40. A bore 41 extends between the inlet 39 and the outlet 40 and contains a by-pass valve 42. This valve 42 comprises a valve member 43 urged in an upstream direction against a valve seat 44 by a spring 45.

A further bore 47 is provided in the body 31 leading from the bore 41 at a position intermediate its ends and downstream of the by-pass valve 42. One end of a sleeve 48 is connected to this bore 47 with the sleeve 48 depending downwardly from the bore 47 and having its opposite end in fluid-tight connection with the core 36 of the filter element 38. The sleeve 48 provides an outlet passage leading from the core 36 to the bore 41.

The sleeve 48 contains, and holds for limited axial movement, a rod 49 having at its upper end a valve member 50 which, in the position shown in FIG. 2, seats on the end of the sleeve 48 to close the sleeve 48 thus preventing the passage of fluid from the bore 41 to the filter element 34. However, the valve member 50 and the rod 49 can be lifted by flow of fluid from the filter element 34 to the bore 41 to open the passage. Thus the valve member 50 provides an anti-backflow valve.

An inlet passage 51 leads from the bore 41 at a position upstream of the by-pass valve 42. The passage passes through a right-angled bend before emerging into an annular chamber 52 formed between the exterior of the sleeve 48 and the body 31. This chamber 52 communicates with the annular space 37 around the exterior of the filter element 34.

A ball valve 53 is provided in the bend in the inlet passage 51 and is operable by a handle 54 to open and close the passage 51.

A port 55 extends through the body 31 from the chamber 52 to the exterior of the body 31. A screw 56 is threaded into the port 55 to allow the port to be opened and closed. The port 55 and screw 56 together form a vent plug.

A further port 57 extends from the chamber 52 to a point in the bore 41 downstream of the further bore 47. This further port 57 may be opened and closed by operation of the screw 58 and forms a re-pressurization valve.

The filter unit described above with reference to FIG. 2 operates as follows.

The inlet 39 is connected to the source of fluid to be filtered. This may be a gas or a liquid such as oil. The outlet 40 is connected to a system which requires filtered fluid. The handle 54 is operated so that the ball valve 53 opens the inlet passage 51 and the screws 56 and 58 are closed to close the vent plug and the drain plug.

Fluid entering the inlet 39 thus passes through the inlet passage 51 to the chamber 52 via the ball valve 53. The pressure of the fluid, with the ball valve 53 open, is insufficient to open the valve member 50 and so no fluid passes through the bore 41 to the outlet 40.

Fluid then passes from the chamber 52 into the casing 33 and is filtered by passing through the filter media 35. The filtered fluid enters the core 36 and from there passes through the sleeve 48 into the bore 41 opening the valve member 50. From the bore 41, the fluid passes to the outlet 40.

When the filter element 34 is to be changed, the procedure is as follows. First, the handle 54 is operated to close the ball valve 53. This produces a rise in fluid pressure at the by-pass valve 42 which moves the valve member 43 off the seat 44 and so allows fluid to pass direct from the inlet 39 through the bore 41 to the outlet 40. The bore 41 thus acts as a by-pass passage.

The screw 56 is then opened to open the vent plug to allow fluid pressure to decay. The drain plug 33 is then opened to drain fluid from the casing 32 and when this has been done the casing 32 is unscrewed from the body 31 and the filter element 34 is removed and replaced with a fresh element. The casing 32 is then screwed back on to the body and the drain plug 33 is closed. The screw 58 is then unscrewed to open the re-pressurization valve. Fluid passes from the bore 41 through the further port 57 and into the casing 32. Displaced air leaves via the vent port 55. When fluid emerges from the vent port 55, the screws 56 and 58 are screwed in to close the vent port and the re-pressurization valves. The handle 54 is then operated to open the inlet passage 51 to resume filtration of the fluid. The by-pass valve 42 closes under the action of the spring 45.

It will be appreciated that, of course, the valve unit need not be exactly as described above with reference to FIGS. 1 and 2. The drain plug could be omitted with, in FIG. 2, the casing 32 being emptied after being detached from the body 31.

In addition, the re-pressurization valve and the vent port could be omitted. After the new filter element has been replaced, the inlet valve can simply be opened to pass fluid to the new filter element. However, the presence of these two is preferred in order to remove air from the fluid.

We claim:

1. A filter unit comprising a housing including a bowl, a filter element disposed in the bowl, means defining an inlet passage leading through the housing to the bowl for passage thereto of fluid to be filtered, means defining an outlet passage for filtered fluid leading through the housing from the bowl, an anti-backflow valve in the outlet passage, means defining a by-pass passage extending through the housing between a first point in the inlet passage and second point on the outlet passage on a downstream side of the anti-backflow valve, an inlet valve provided in the inlet passage between the first point and the filter element and operable to open or close the inlet passage, a by-pass valve which operates to open the by-pass passage when the inlet passage is closed for replacement of the filter element in the bowl and to close the by-pass passage when the inlet passage is open to re-direct fluid to the filter element, means defining a pressurization passage in the housing between the by-pass passage and a point on the inlet passage between the inlet valve and the bowl, and a repressurization valve provided in the housing and which is normally closed but operates to open the repressurization passage to pass fluid from the by-pass passage to the bowl with the inlet valve closed.

2. A filter unit according to claim 1 wherein a vent plug is provided in the housing and operates to vent the bowl to atmosphere.

3. A filter element according to claim 1 comprising a drain plug connected to the bowl for draining fluid from the bowl before removal of a used filter element.

4. A filter unit according to claim 1 wherein the housing includes a body to which the bowl is detachably secured, the by-pass passage comprises a first bore having a linear axis and extending through the body between an inlet and an outlet of the body, the inlet passage branches from the bore and leads to the bowl, and the outlet passage comprises a second bore extending through the body from the bowl to the first bore.

5. A filter unit according to claim 4 wherein the bowl includes a cylindrical casing closed at a lower end thereof and having an open upper end in threaded engagement with the body, and the second bore is arranged co-axially with the axis of the body.

6. A filter unit according to claim 5 comprising a generally cylindrical sleeve connected to a central outlet passage of the filter element, the inlet passage communicating with an annular chamber formed between an exterior surface of the sleeve and the body, the chamber leading to the bowl for passing fluid to be filtered to a space between the bowl and an exterior surface of the filter element.

7. A filter unit according to claim 6 wherein the sleeve forms a housing for the anti-backflow valve.

8. A filter unit according to claim 6 comprising a vent plug provided in the housing for venting the bowl to atmosphere and connected between the annular chamber and an exterior of the body.

9. A filter unit according to claim 1 wherein the inlet valve is manually operable.

10. A filter unit comprising:
a housing body including an inlet and an outlet,
a bowl connected to the housing body,
a filter element disposed in the bowl,
an inlet passage extending between the inlet and the bowl,
an inlet valve provided in the inlet passage to open and close the inlet passage,
a by-pass passage extending between the inlet and the outlet,
a by-pass valve provided in the by-pass passage and permitting flow through the by-pass passage when the inlet valve is closed,
an outlet passage extending between the bowl and the by-pass passage,
an anti-backflow valve provided in the outlet passage for preventing flow from the outlet passage to the bowl,
a repressurization passage extending between a point in the inlet passage between the inlet valve and the filter element and the outlet, and
a repressurization valve provided in the repressurization passage to open and close the repressurization passage.

11. A filter unit according to claim 10 wherein the inlet valve comprises a ball valve including a handle operable to open and close the ball valve.

12. A filter unit according to claim 11 wherein the by-pass valve comprises a valve seat, a valve member and spring means urging the valve member against the valve seat.

13. A filter unit comprising:
a housing including an inlet, an outlet, and first, second and third passages, the first and second passages arranged to provide parallel flow between the inlet and the outlet;
an inlet valve disposed in the first passage;
a filter element disposed in the first passage between the inlet valve and the outlet;
an anti-back flow valve disposed in the first passage between the filter element and the outlet;
a by-pass valve disposed in the second passage; and
a valve disposed in the third passage, the third passage extending between a first point in the first passage and a second point in the second passage, the first point being located between the inlet valve and the filter element and the second point being located between the by-pass valve and the outlet.

* * * * *